(12) United States Patent
Lodde et al.

(10) Patent No.: US 10,569,354 B2
(45) Date of Patent: Feb. 25, 2020

(54) METHOD FOR ASSEMBLING TEXTILE ADHESIVE TAPES

(71) Applicant: COROPLAST FRITZ MÜLLER GMBH & CO. KG, Wuppertal (DE)

(72) Inventors: Christoph Lodde, Holzwickede (DE); Gülay Wittig, Bochum (DE); Thomas Zakrzowski, Wuppertal (DE); Klaus Becker, Sprockhövel (DE)

(73) Assignee: Coroplast Fritz Müller GmbH & Co., Wuppertal (DE)

( * ) Notice: Subject to any disclaimer, the term of this patent is extended or adjusted under 35 U.S.C. 154(b) by 119 days.

(21) Appl. No.: 15/548,021

(22) PCT Filed: Feb. 3, 2016

(86) PCT No.: PCT/EP2016/052242
§ 371 (c)(1),
(2) Date: Aug. 1, 2017

(87) PCT Pub. No.: WO2016/128268
PCT Pub. Date: Aug. 18, 2016

(65) Prior Publication Data
US 2018/0016472 A1    Jan. 18, 2018

(30) Foreign Application Priority Data
Feb. 13, 2016   (DE) .......................... 10 2015 102 104

(51) Int. Cl.
| | | |
|---|---|---|
| C09J 157/06 | (2006.01) |
| D06H 7/22 | (2006.01) |
| D06H 7/00 | (2006.01) |
| B23K 20/10 | (2006.01) |
| C09J 7/21 | (2018.01) |
| B23K 103/00 | (2006.01) |

(Continued)

(52) U.S. Cl.
CPC ............ B23K 20/10 (2013.01); B23K 20/106 (2013.01); C09J 7/21 (2018.01); D06H 7/005 (2013.01);

(Continued)

(58) Field of Classification Search
CPC .. B23K 20/10; B23K 20/106; B23K 2103/38; D06H 7/005; D06H 7/223; C09J 2205/10;

(Continued)

(56) References Cited

U.S. PATENT DOCUMENTS

| | | |
|---|---|---|
| 5,230,761 A | 7/1993 | Crawford |
| 5,318,420 A | 6/1994 | Blaimschein |

(Continued)

FOREIGN PATENT DOCUMENTS

| | | |
|---|---|---|
| CH | 702 818 A2 | 9/2011 |
| DE | 37 50 672 T2 | 10/1994 |

(Continued)

OTHER PUBLICATIONS

International Search Report of PCT/EP2016/052242, dated Apr. 19, 2016.

*Primary Examiner* — Ghassem Alie
(74) *Attorney, Agent, or Firm* — Brinks Gilson & Lione

(57) ABSTRACT

A method for assembling cable wrapping tapes. From an adhesive tape parent roll, strip-like adhesive tapes (11), each having two cut edges (12a) on the sides, are produced from a textile material which has an adhesive coating (12) on one side, by cutting in the drawing direction of the parent roll. The cutting is performed using an ultrasound-excited cutting tool (1) and wherein the cutting is performed using a cooled cutting tool (1). An adhesive tape (11), having a strip-like textile carrier material (13) and an adhesive coating (12) applied to one side and two cut edges (12a) on the sides. The cut edges (12a) are created by ultrasound cutting, and the textile carrier material (13) of the carrier is fused to its cut edges (12a). No adhesive coating (12) exists on the cut edges (12a); which are free of lint and threads.

12 Claims, 2 Drawing Sheets

(51) Int. Cl.
*C09J 121/00* (2006.01)
(52) U.S. Cl.
CPC ......... *D06H 7/223* (2013.01); *B23K 2103/38* (2018.08); *C09J 121/00* (2013.01); *C09J 157/06* (2013.01); *C09J 2201/16* (2013.01); *C09J 2203/302* (2013.01); *C09J 2205/10* (2013.01); *C09J 2400/263* (2013.01); *C09J 2421/00* (2013.01); *C09J 2433/00* (2013.01); *C09J 2467/006* (2013.01); *C09J 2477/006* (2013.01)
(58) Field of Classification Search
CPC ............... C09J 2421/00; C09J 2201/16; C09J 2477/006; C09J 7/21; C09J 2203/302; C09J 2400/263; C09J 2433/00; C09J 2467/006; C09J 157/06; B32B 3/02; B32B 37/12; B32B 2262/00; B32B 2262/0284; B32B 2307/75; B32B 2307/718; B32B 2255/02; B32B 5/00; B32B 7/02; B32B 27/12; B32B 27/30; B32B 27/32
USPC ............... 83/13, 39, 100; 428/212, 138, 58; 156/193, 73.1, 265, 308.2, 73.129, 216, 156/290, 73.4, 157, 304.1, 304.6, 580.1, 156/185; 422/60, 189, 334, 401, 398, 422/365
See application file for complete search history.

(56) References Cited

U.S. PATENT DOCUMENTS

| | | | |
|---|---|---|---|
| 6,936,553 | B2 | 8/2005 | Samson-Himmelstjerna |
| 9,222,002 | B2 | 12/2015 | Meier et al. |
| 2002/0195478 | A1* | 12/2002 | Yamano ................ B29C 65/08 228/110.1 |
| 2002/0197345 | A1* | 12/2002 | Kubik .................... B29C 65/26 425/174.2 |
| 2009/0025853 | A1* | 1/2009 | Abate .................. B29C 65/086 156/73.1 |
| 2010/0048074 | A1 | 2/2010 | Wahlers-Shcmidlin et al. |
| 2011/0229688 | A1* | 9/2011 | Cotton ................... A61L 15/60 428/138 |
| 2012/0238172 | A1* | 9/2012 | Siebert ................... B32B 5/022 442/334 |
| 2014/0141159 | A1* | 5/2014 | Meier ........................ C09J 7/20 427/208 |
| 2015/0298422 | A1* | 10/2015 | Lodde ....................... B32B 5/00 428/193 |
| 2016/0168427 | A1* | 6/2016 | Lodde ........................ C09J 7/29 428/220 |
| 2018/0200831 | A1* | 7/2018 | Rambusch ............. B65H 35/02 |

FOREIGN PATENT DOCUMENTS

| | | |
|---|---|---|
| DE | 692 23 713 T2 | 8/1998 |
| DE | 103 29 994 A1 | 1/2005 |
| DE | 10 2011 005200 A1 | 9/2012 |
| DE | 20 2011 110 445 U1 | 2/2014 |
| DE | 20 2015 103 713 U1 | 7/2015 |
| EP | 0 267 604 A2 | 5/1988 |
| EP | 0540495 A1 | 5/1993 |
| EP | 0 534 300 B1 | 12/1997 |
| EP | 1 300 452 A2 | 4/2003 |
| EP | 2 157 147 A2 | 2/2010 |
| EP | 2 497 805 A1 | 9/2012 |
| EP | 2 821 453 A1 | 1/2015 |
| EP | 2 824 153 A1 | 1/2015 |
| WO | WO 2013/024150 A2 | 2/2013 |

* cited by examiner

METHOD FOR ASSEMBLING TEXTILE ADHESIVE TAPES

CROSS-REFERENCE TO RELATED APPLICATIONS

This application is a 35 U.S.C. § 371 national phase application of International Application No.: PCT/EP2016/052242, filed Feb. 3, 2016, which claims the benefit of priority under 35 U.S.C. § 119 to European Patent Application No.: EP 10 2015 102 104.8, filed Feb. 13, 2015, the contents of which are incorporated herein by reference in their entirety.

FIELD OF THE INVENTION

The present invention relates to a method for assembling textile adhesive tapes, produced from the tape parent roll made of a plurality of strip-like adhesive tapes, each with two cut edges, with the tape parent roll having at least one adhesive layer applied to one side by cutting in the drawing direction of the parent roll.

In addition, the present invention relates to an adhesive tape, including a strip-like textile carrier and a one-sided adhesive coating and two cut edges on the sides.

BACKGROUND

The following assembly methods are known for a method of the type generally described above.

1. Cutting apart of the rolls from the parent roll, what is called cutting apart assembly;
2. Cutting the rolls with a razor blade cut, whereby a stationary cutter is used;
3. Cutting the rolls with a crush-cut cutter (circular cutter) and a counter shaft located here;
4. Cutting the rolls with a fine and thick zigzag cut;
5. Cutting the rolls with circular cutters, which have various perforations; and
6. Cutting the rolls with what is called a scissors cut.

All the assembly processes noted above have the disadvantage that with woven fabric and with bonded fabric, threads and pieces of lint may build up on the individual tape edges. Generally, this leads to customer complaints, since the cable batches that are wrapped with this type of adhesive tape do not look good, and the working process is disturbed for cable batch providers.

The basic task A feature of this invention is to avoid the disadvantages noted above and to prepare a method with which adhesive tapes can be manufactured with a smooth edge without fraying or thread or lint build-up.

In addition, a feature of the present invention is to make available an adhesive tape that has smooth edges, so that no thread or lint build-up exists on the edges.

According to the invention, the above features are achieved by starting from the procedure of this type by cutting with ultrasound, whereby an ultrasound excited cutting tool is used, and ultrasound cutting occurs during cooling of the cutting area and/or with the use of a cooled cutting tool.

The cooling according to the invention in particular has a cooling effect on the edges of the tape material provided with the adhesive layer.

Cutting by ultrasound on textile materials as such is known. Herein the woven textile fabric is divided precisely using ultrasound oscillations. Due to the reduced force necessary in ultrasound cutting, the vibration of the cutting tool is less than in standard cutters. Accordingly, no deformation takes place of the carrier materials due to pressing or pinching. The textile materials are sealed on their edges by the ultrasound cutting, so that as a result the edges are not subject to fraying or build-up of lint.

A feature of this invention is the recognition that the cooling of the cutting area and/or of the cutting tool prevents the adhesive layer from fusing on, and prevents an adhesive film from being formed through which ultrasound cutting would be blocked and the cutters that are used would get dirty. Such a fluid separating film would prevent a clean separation of the materials.

SUMMARY AND INTRODUCTORY DESCRIPTION OF THE INVENTION

According to the invention, the method according to the invention also has the advantage that when a sonotrode and a facing cutting wheel are used as a cutting tool, wherein the adhesive tape runs between them, and the sonotrode and/or the cutting wheel is or are cooled during the cutting process, as a result the formation of a fluid separating film due to the fusing on of the adhesive layer is prevented. The cooling temperature in particular for the sonotrode and/or the cutting wheel is for example 10° C. Deviations of ±20% from this are considered to be also available.

In the method according to the invention, the edges of the material are heat sealed to each other and simultaneously the adhesive of the adhesive layer is prevented from spreading on to the cut edge, since a fusing on of the adhesive layer is prevented by the cooling according to the invention in particular in the area of the edges.

In addition, according to the invention it is advantageous if the ultrasound cutting occurs at a cutting angle of 90° to 145°. This cutting angle area according to the invention enables the prevention of a build-up of a separating film and a clean heat seal on the edges of the carrier material.

Ultrasound cutting in the assembly of adhesive tapes offers the following advantages, in particular of adhesive tapes for wrapping cable units, meaning what are called cable wrapping tapes:

Rapid and variable cuts,
Clean separation of the material with sealed cut edges, whereby the cutting and the edge sealing occur in one process,
High cutting speeds, e.g. 25 m/min.
Reduced downtime for cleaning,
Unfrayed, firm, sealed edges,
Environmentally friendly technology,
Low energy need and thereby rapid cycle times,
A continuous cutting method when using the roll-sonotrode.

The method according to the invention is applicable for all standard textile carrier materials. According to the invention, the process is used in particular for cutting PA fabric, PET fabric, PET stitch-bonded non-woven fabric, and PET fiber-bonded non-woven fabric. In addition, according to the invention, for manufacture and assembly of the adhesive tapes, an acrylate adhesive, in particular a polyacrylate adhesive, or a synthetic rubber adhesive is used as an adhesive coating.

In addition, the invention relates to an adhesive tape, in particular a cable adhesive tape, that in particular is manufactured according to the method according to the invention, whereby this adhesive tape, in particular a technical adhesive tape, includes a strip-like textile carrier material, a one-sided adhesive coating, and two edge cuts. According to the invention, the edge cuts are created by ultrasound cutting, whereby the textile carrier material is fused onto the cut edges, has no adhesive coating on the cut edges, and is free of lint and threads.

Other advantageous embodiments of the invention are described herein.

BRIEF DESCRIPTION OF THE DRAWINGS

Below the invention will be discussed in greater detail based on examples of embodiments making reference to the appended Figures, which show.

DETAILED DESCRIPTION OF THE INVENTION

Figure 3:
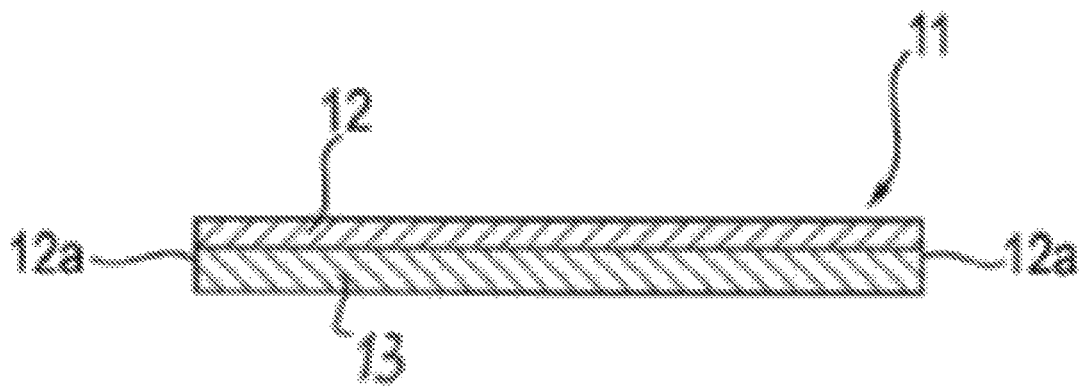
FIG. 3 is a cross-section view of an adhesive tape manufactured according to the invention.

In a method according to the invention for assembling textile adhesive tapes 11, see with particular reference to FIG. 3, in particular cable wrapping tapes, a plurality of strip-like adhesive tapes each with two cut edges 12a are created from one adhesive tape parent roll with a one-sided adhesive coating 12 attached by cutting in the drawing direction Z of the parent roll, whereby the cutting occurs by ultrasound. In this example, an ultrasound excited cutting tool is used, and the ultrasound cutting occurs with simultaneous cooling of the cutting area and/or of the cutting tool. In this example, there is a forward pushing speed of 25 m/min., with which the parent roll is withdrawn.

Figure 1:
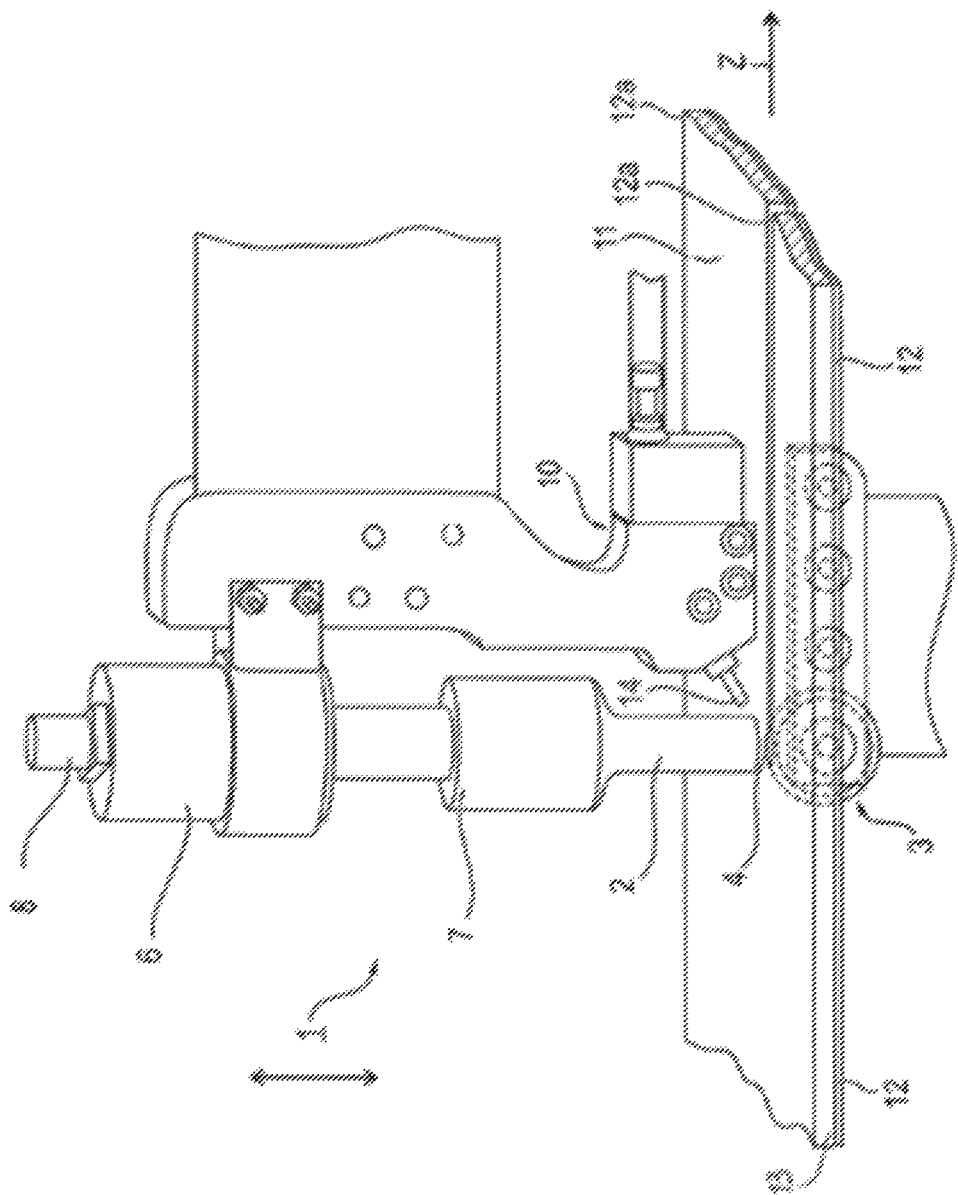
FIG. 1 is a view of a cutting device used in the method according to the invention.

In FIG. 1, an example of an embodiment is shown of an ultrasound-cutting tool used according to the invention. In this embodiment, the cutting tool 1 consists of a sonotrode 2 and a facing cutting device 3, whereby this cutting device 3 has a cutting wheel 4. The sonotrode 2 transmits the sound through the substrate to be cut onto the facing cutting wheel 4, in the present case a textile carrier material 13 of an adhesive tape parent roll provided with an adhesive layer 12. The cutting wheel 4 has the function of separating the material and in each case fusing or sealing the cut edges 12a, whereby the coated tape runs between the cutting wheel 4 and the sonotrode 2, as shown in FIG. 1. The geometry of the cutting wheel 4 is adjusted according to the desired cutting result. In addition, the ultrasound system of the cutting tool 1 has an ultrasound generator, not illustrated, which is attached to an ultrasound converter 6 via an appropriate connector, to which the sonotrode 2 is attached at the end. Through the ultrasound converter 6, electronically created vibrations of the generator are converted into mechanical movements. These mechanical movements are transferred to the coated material to be cut via a transformation piece 7 and a cutting sonotrode 2 prepared for this application. In fractions of seconds the ultrasound vibrations create a cut through the coated material to be cut. A standard frequency area of a sonotrode 2 used according to the invention lies between 20,000 Hz up to and including 90,000 Hz. For example, a vibration frequency of 30 kHz and an amplitude height of the vibration of 15μ to 30μ can be created. According to the invention materials of 0.05 to 180 mm thickness can be cut. The particular cutting width depends on the structural form of the sonotrode 2. A minimum width is about 5 mm; the maximum cutting width is defined variably.

Figure 2:
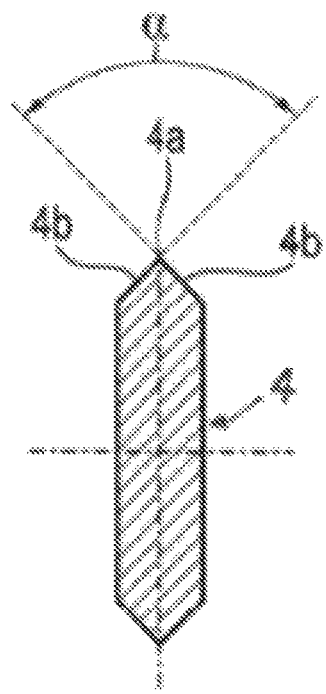
FIG. 2 is a view through a cutting wheel of a cutting tool used according to the invention.

According to the invention, it is advantageous if the cutting angle α of the cutting wheel 4 is 90° to 145°, see FIG. 2. For a cutting angle α, the applicable angle is the one that is enclosed by the cutting wheel side surfaces 4b in a cutting edge 4a of the cutting wheel 4, see FIG. 2. This cutting angle α can be created by a corresponding polishing of the cutting wheel 4. The standard chemical fibers can be considered as textile carrier materials, whereby the carrier materials may be formed for example as woven fabric, non-woven fabric, stitch bonded non-woven fabric, or fiber-bonded fabric. Advantageously, the carrier materials that are used have a surface weight between 30 g/m² and 300 g/m². Adhesive materials for the adhesive coating 12 that are used are in particular synthetic rubbers or acrylate adhesive materials, in particular poly-acrylate materials. The adhesive application weight is preferentially between 40 g/m² and 200 g/m². Their melting point ranges from 70° C. to 250° C. In synthetic rubber adhesives, the melting point is 80° C. to 160° C. The textile thread material and/or fiber material that is used, for example polyamide or polyamide 6.6, has a melting point of >200° C. or >250° C., or for example a polyester that is used has a melting point of >210° C. The particular plastic becomes fluid above the given melting points.

Also to be recognized from FIG. 1, according to the invention it is advantageous if the sonotrode 2 is cooled by a cooling device, for example through internal air cooling, for which for example an appropriate attachment unit 8 on the converter 6 is available for inserting cooling air. In addition, it is advantageous according to the invention that additionally or alternatively the cutting device 3, that is, the cutting wheel 4, is cooled by a cooling unit 10, in which in particular cool air is introduced through an exit jet 14 by air cooling in the cutting area. The cooling of the sonotrode 2 and/or of the cutting wheel 4 prevents the adhesive coating 12 of the carrier material from becoming fluid in the cutting area and creating a separating film. In this example according to the invention, the adhesive coating 12 is prevented from spreading out into the cutting edge area, so that according to the invention the cutting edge area, that is, the lengthwise edge 12a of the adhesive tape, is free of the adhesive material of the adhesive coating 12. In addition, in this way in particular secure sealing is effected in connection with the cutting angle area according to the invention, that is, the fusing of the carrier material in the lengthwise edge area, meaning on the cutting edge 12a. Thereby a cutting edge free of lint and thread occurs, which is also free of adhesive material.

Exemplary embodiments are contained in the following examples of methods 1 to 4.

Method Example 1

Cutting cable wrapping tapes with PA fabric 185 g/m² with a cooled sonotrode and a cooled cutting wheel.

| Cutting angle α | | | | | | |
|---|---|---|---|---|---|---|
| 20 degrees | 45 degrees | 90 degrees | 110 degrees | 120 degrees | 140 degrees | 145 degrees |
| Film creation | heavy | heavy | Minimal/none | No | No | No | Minimal |
| Heat fusing of the edges | No | partially | Yes | Yes | Yes | Yes | Yes |
| Thread creation | Yes | Yes | Yes | No | No | No | No |
| Lint creation | Yes | Yes | Yes | No | No | No | No |

Method Example 2

Cutting cable wrapping tapes with PET fabric 130 g/m² with a cooled sonotrode and a cooled cutting wheel.

| Cutting angle α | | | | | | |
|---|---|---|---|---|---|---|
| 20 degrees | 45 degrees | 90 degrees | 110 degrees | 120 degrees | 140 degrees | 145 degrees |
| Film creation | heavy | heavy | No | No | No | No | Minimal |
| Heat fusing of the edges | No | partially | Yes | Yes | Yes | Yes | Yes |
| Thread creation | Yes | Yes | No | No | No | No | No |
| Lint creation | Minimal | Minimal | No | No | No | No | No |

Method Example 3

Cutting cable wrapping tapes with PET fabric 70 g/m² with a cooled sonotrode and a cooled cutting wheel.

| Cutting angle α | | | | | | | |
|---|---|---|---|---|---|---|---|
| 20 degrees | 45 degrees | 60 degrees | 90 degrees | 110 degrees | 120 degrees | 140 degrees | 145 degrees |
| Film creation | heavy | heavy | Minimal No | No | No | No | No | No |
| Heat fusing of the edges | Minimal | partially | Yes | Yes | Yes | Yes | Yes | Yes |
| Thread creation | Yes | Yes | Yes | No | No | No | No | No |
| Lint creation | Yes | Yes | Yes | No | No | No | No | No |

Method Example 4

Cutting cable wrapping tapes with PET stitch-bonded non-woven fabric 60 g/m² with a cooled sonotrode and a cooled cutting wheel.

| Cutting angle α | | | | | | | |
|---|---|---|---|---|---|---|---|
| 20 degrees | 45 degrees | 60 degrees | 90 degrees | 110 degrees | 120 degrees | 140 degrees | 145 degrees |
| Film creation | heavy | heavy | Minimal No | No | No | No | No | No |
| Heat fusing of the edges | Minimal | partially | Yes | Yes | Yes | Yes | Yes | Yes |
| Thread creation | Yes | Yes | Yes | No | No | No | No | No |
| Lint creation | Yes | Yes | Yes | No | No | No | No | No |

In accord with a set surface weight of the carrier material, it results that according to the invention it is advantageous for the minimum cutting angle to be 90° and the maximum cutting angle to be 145°, with a cooling of the sonotrode 2 and a cooling of the cutting wheel 4. The embodiments in the method examples 1 to 4 have a cutting angle according to the invention greater than or equal to 90°.

The method Examples 5 to 7 show that either with omitted cooling of the sonotrode 2 and of the cutting wheel 4 or of an alternative cooling of sonotrode 2 or cutting wheel 4 or with other cutting angles, a poor fusing of the cutting edges takes place, and additionally thread and lint formation is not prevented.

Method Example 5

Cutting cable wrapping tapes with PA woven fabric 185 g/m² without cooled sonotrode and cutting wheel.

| | Cutting angle α | | |
|---|---|---|---|
| | 90 degrees | 110 degrees | 120 degrees |
| Film creation | very heavy | very heavy | very heavy |
| Heat fusing of the edges | Minimal | Minimal | Minimal |
| Thread creation | Yes | No | No |
| Lint creation | Yes | Yes | Yes |

Method Example 6

Cutting cable wrapping tapes with PA woven fabric 185 g/m² without cooled sonotrode and cutting wheel.

| | Cutting angle α | | |
|---|---|---|---|
| | 90 degrees | 110 degrees | 120 degrees |
| Film creation | very heavy | very heavy | very heavy |
| Heat fusing of the edges | Minimal | Minimal | Minimal |
| Thread creation | Yes | Yes | Yes |
| Lint creation | Yes | Yes | Yes |

Method Example 7

Cutting cable wrapping tapes with PA woven fabric 185 g/m² with cooled sonotrode and without cooled cutting wheel.

| | Cutting angle α | | |
|---|---|---|---|
| | 90 degrees | 110 degrees | 120 degrees |
| Film creation | Minimal | Minimal | Minimal |
| Heat fusing of the edges | Yes | Yes | Yes |
| Thread creation | Yes | Yes | Yes |
| Lint creation | Yes | No | No |

The following table gives examples of embodiments, without limiting the invention, for construction of woven fabric and fiber fabric as well as for the adhesive layer of textile adhesive tapes according to the invention, in particular cable wrapping tapes.

| | Unit | PA woven fabric | PET woven fabric 130 g/m² | PET woven fabric 70 g/m² | PET woven fabric 60 g/m² |
|---|---|---|---|---|---|
| Surface weight carrier | g/m² | 185 | 130 | 70 | 60 |
| Type of fiber | — | Polyamide 6.6 | 100% Polyester | 100% Polyester | 100% Polyester |
| Number of warp threads | 1/cm | 20 | 45 | 32 | 20 |
| Yarn type of warp threads | — | Filament, smooth or textured, dyed as spun or by item | Filament, intermingled/textured and dyed by spin jets | Filament, intermingled/textured and dyed by spin jets | Filament, intermingled/textured and dyed by spin jets |
| Number of filaments in warp threads | item | 68 | 36 | 36 | 24 |
| Thread strength of the warp threads | dtex | 470 | 167 | 84 | 40 |
| Warp threads strength according to width | dtex/cm | 9400 | 7515 | 2688 | 800 |
| Number of weft threads | 1/cm | 16 | 25 | 30 | 30 |
| Yarn type of weft threads | — | Filament, smooth or textured, dyed as spun or by item | Filament, intermingled/textured and dyed by spin jets | Filament, intermingled/textured and dyed by spin jets | Filament, intermingled/textured and dyed by spin jets |
| Number of filament weft threads | item | 68 | 36 | 36 | 36 |
| Thread strength of the warp threads | dtex | 470 | 167 | 167 | 167 |
| Warp thread strength according to length | dtex/cm | 7520 | 4175 | 5010 | 5010 |

-continued

| | Unit | PA woven fabric | PET woven fabric 130 g/m² | PET woven fabric 70 g/m² | PET woven fabric 60 g/m² |
|---|---|---|---|---|---|
| Adhesive material | — | Acrylate adhesive material | Acrylate adhesive material | Synthetic rubber | Acrylate adhesive material |
| Applied adhesive weight | g/m² | 100 | 80 | 50 | 40 |
| Thickness | mm | 0.33-0.35 | 0.24-0.25 | 0.14-0.16 | 0.10-0.12 |
| Elongation at rupture | % | 21-35 | 35-40 | 26-38 | 15-18 |
| Breaking force | N/cm | 400-1.100 | 200-350 | 80-150 | 50-100 |

The invention is not limited to the embodiments that are shown and described, but rather includes all embodiments that act the same way within the meaning of the invention. It is expressly claimed that the embodiments are not limited to all the characteristics in the combinations, but rather every individual partial characteristic may have an inventive significance separate from all the other partial characteristics. In addition, the invention is not limited to the combination of characteristics defined in claim 1, but can be defined as well through any other combination of specific characteristics of all the individual characteristics presented together.

While the above description constitutes the preferred embodiment of the present invention, it will be appreciated that the invention is susceptible to modification, variation and change without departing from the proper scope and fair meaning of the accompanying claims.

What is claimed is:

1. A method of manufacturing textile adhesive tapes, whereby the adhesive tapes are created by cutting a parent tape roll consisting of a textile carrier material with an adhesive coating attached on one side of the textile carrier material, whereby the textile carrier material provided with the adhesive coating of the parent tape roll is withdrawn from the parent roll in a withdrawal direction and thereby cut into a plurality of strip-like adhesive tapes having two lengthwise cut edges, whereby the cutting into the strip-like adhesive tapes is performed by ultrasound, wherein an ultrasound excited cutting tool comprising a sonotrode and an opposite facing cutting wheel is used, whereby the textile carrier material provided with the adhesive coating of the parent tape roll runs between the sonotrode and the cutting wheel and the cutting through the textile carrier material provided with the adhesive coating by ultrasound is performed with simultaneous cooling of a cutting area of the ultrasound cutting tool, in order to prevent the adhesive coating of the carrier material becoming fluid in the cutting area and creating a separating film, such that the lengthwise cut edges of the adhesive textile tapes are free of any adhesive material from the adhesive coating.

2. The method according to claim 1, wherein the sonotrode is cooled inside by air and/or the cutting wheel is cooled by a cooling unit.

3. The method according to claim 1, wherein the cutting through the textile carrier material provided with the adhesive coating by ultrasound occurs at a cutting angle (α) that ranges from 90° to 145°.

4. The method according to claim 1, wherein the textile carrier material is a PA woven fabric, a PET woven fabric, a PET stitch-bonded non-woven fabric, or a PET fiber-bonded fabric.

5. The method according to claim 2, wherein the adhesive coating provided on the textile carrier material faces the cutting wheel.

6. The method according to claim 1, wherein the adhesive coating comprises an acrylate adhesive or a synthetic rubber adhesive.

7. The adhesive tape according to claim 6, further comprising the adhesive material of the adhesive coating has a coating weight of 40 g/m² to 200 g/m².

8. An adhesive tape, manufactured according to claim 1, having a strip-like textile carrier and an adhesive coating attached to one side and two cut edges on the sides, further comprising the cut edges are created by the ultrasound cutting, whereby the textile carrier material of the carrier is fused to the cut edges; and no adhesive coating exists on the cut edges; and the cut edges are free of lint and threads.

9. The adhesive tape according to claim 8, further comprising in the area of the cut edges, a lesser tape thickness exists than in a remaining edge area.

10. The adhesive tape according to claim 8, further comprising a PA woven fabric, a PET woven fabric, a PET stitch-bonded non-woven fabric, or a PET fiber-bonded fabric is used as a textile carrier material of the carrier.

11. The adhesive tape according to claim 8, further comprising the adhesive coating is made from an acrylate adhesive or a synthetic rubber adhesive.

12. The adhesive tape according to claim 8, further comprising the carrier material of the carrier has a surface weight of 60 g/m² to 300 g/m².

* * * * *

UNITED STATES PATENT AND TRADEMARK OFFICE
CERTIFICATE OF CORRECTION

PATENT NO. : 10,569,354 B2  
APPLICATION NO. : 15/548021  
DATED : February 25, 2020  
INVENTOR(S) : Christoph Lodde et al.

It is certified that error appears in the above-identified patent and that said Letters Patent is hereby corrected as shown below:

On the Title Page

In Item (30) Foreign Application Priority Data, delete "Feb. 13, 2016" and replace with "Feb. 13, 2015"

In the Specification

In Column 1, Line 48, delete "The basic task"

Signed and Sealed this  
Second Day of June, 2020

Andrei Iancu  
*Director of the United States Patent and Trademark Office*